(12) United States Patent
Jones

(10) Patent No.: US 11,560,846 B2
(45) Date of Patent: Jan. 24, 2023

(54) COMBINED HEAT AND POWER SYSTEM

(71) Applicant: HiETA Technologies Limited, Bristol (GB)

(72) Inventor: Simon Lloyd Jones, Bristol (GB)

(73) Assignee: HiETA Technologies Limited, Bristol (GB)

( * ) Notice: Subject to any disclaimer, the term of this patent is extended or adjusted under 35 U.S.C. 154(b) by 66 days.

(21) Appl. No.: 17/045,857

(22) PCT Filed: Feb. 12, 2019

(86) PCT No.: PCT/GB2019/050371
§ 371 (c)(1),
(2) Date: Oct. 7, 2020

(87) PCT Pub. No.: WO2019/207276
PCT Pub. Date: Oct. 31, 2019

(65) Prior Publication Data
US 2021/0156308 A1 May 27, 2021

(30) Foreign Application Priority Data
Apr. 25, 2018 (GB) ..................... 1806745

(51) Int. Cl.
*F02C 7/10* (2006.01)
*F02C 9/18* (2006.01)
(Continued)

(52) U.S. Cl.
CPC ............ *F02C 7/10* (2013.01); *F02C 9/18* (2013.01); *F02C 6/18* (2013.01); *F02C 9/52* (2013.01);
(Continued)

(58) Field of Classification Search
CPC ...... F02C 7/10; F02C 1/04; F02C 3/14; F02C 6/18; F02C 9/18; F02C 9/52; F05D 2240/35; F05D 2240/60; F05D 2240/606
See application file for complete search history.

(56) References Cited

U.S. PATENT DOCUMENTS 3,893,300 A * 7/1975 Connell ................ F02G 1/02
60/683
5,105,617 A * 4/1992 Malohn ................ F02C 7/10
60/39.511
(Continued)

FOREIGN PATENT DOCUMENTS

| GB | 2 014 662 | | 8/1979 | |
|---|---|---|---|---|
| GB | 2573131 | A * | 10/2019 | ............... F02C 7/10 |

(Continued)

OTHER PUBLICATIONS

International Search Report and Written Opinion of the ISA for PCT/GB2019/050371, dated May 20, 2019, 14 pages.
Search Report for GB1806745.4, dated Oct. 23, 2018, 5 pages.

*Primary Examiner* — Craig Kim
(74) *Attorney, Agent, or Firm* — Nixon & Vanderhye P.C.

(57) ABSTRACT

A combined heat and power system comprises a shaft (4), a compressor (6) coupled to the shaft to compress intake gas to form compressed gas; a recuperator (10) to heat the compressed gas to form heated compressed gas; a combustor (12) to combust a fuel and the heated compressed gas to form combustion gas; a turbine (8) coupled to the shaft to expand the combustion gas to form exhaust gas; a load (24) coupled to the shaft; an exhaust outlet (18) to expel the exhaust gas to a heater for heating a fluid based on heat from the exhaust gas; a recuperator channel (28) providing a path for the exhaust gas to flow from the turbine to the exhaust outlet through the recuperator; and a bypass channel (22)

(Continued)

Figure 1:
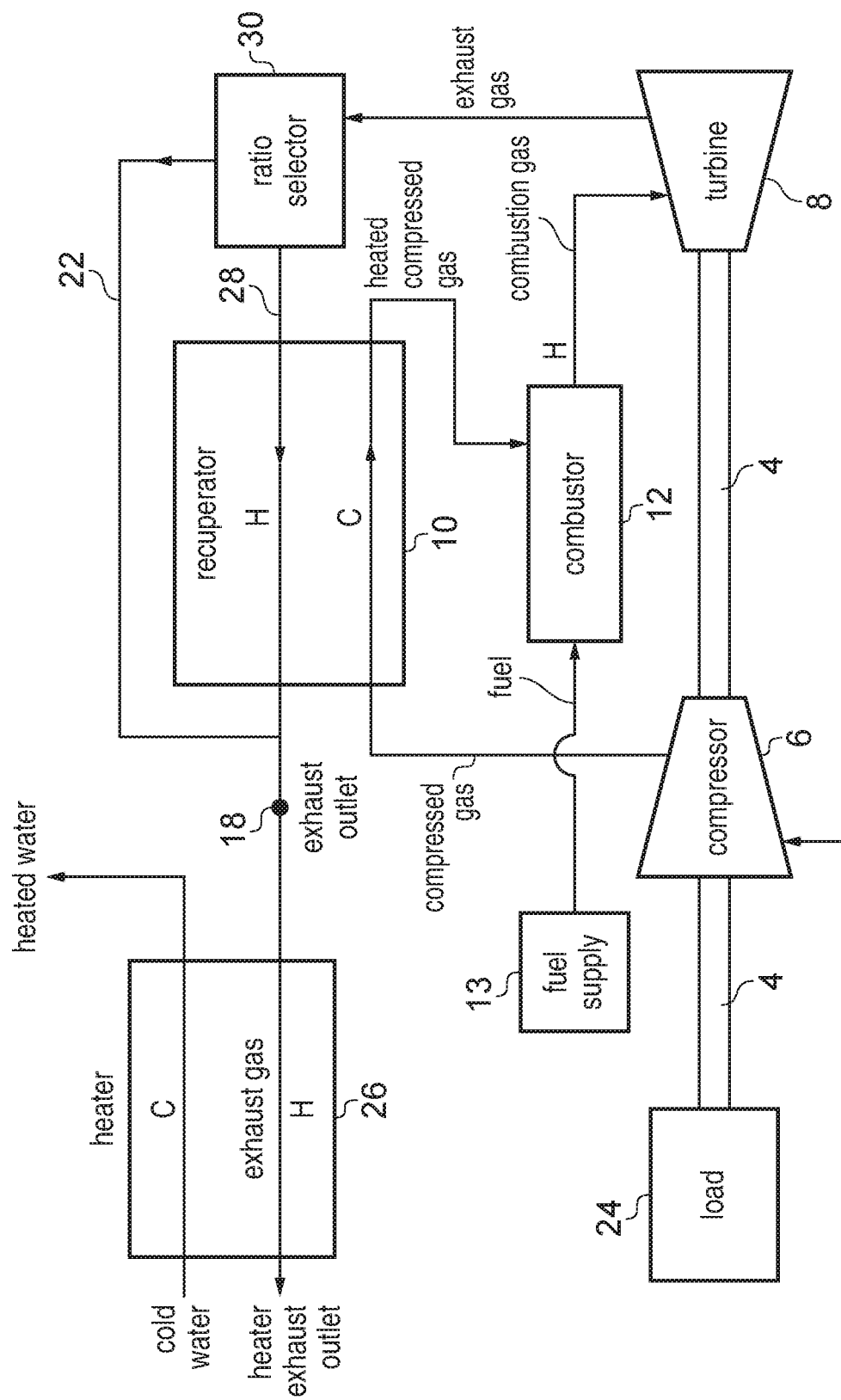

providing a path for the exhaust gas to flow from the turbine to the exhaust outlet bypassing the recuperator.

16 Claims, 11 Drawing Sheets

(51) Int. Cl.
    *F02C 6/18*     (2006.01)
    *F02C 9/52*     (2006.01)

(52) U.S. Cl.
    CPC ...... *F05D 2240/35* (2013.01); *F05D 2240/60* (2013.01); *F05D 2260/606* (2013.01)

(56) References Cited

U.S. PATENT DOCUMENTS

| | | | | |
|---|---|---|---|---|
| 5,212,942 | A * | 5/1993 | Malohn | F28F 13/12 60/784 |
| 5,855,112 | A * | 1/1999 | Bannai | F02C 7/08 60/39.511 |
| 6,438,936 | B1 * | 8/2002 | Ryan | F02C 7/10 60/39.511 |
| 6,711,889 | B2 * | 3/2004 | Kuo | F02C 3/14 165/164 |
| 7,861,510 | B1 * | 1/2011 | Wilson, Jr. | F02C 7/10 60/39.511 |
| 9,118,226 | B2 * | 8/2015 | Kacludis | F01K 23/16 |
| 2009/0193812 | A1 | 8/2009 | Kirzhner | |
| 2013/0236299 | A1 * | 9/2013 | Kington | F02C 7/08 415/177 |
| 2013/0318988 | A1 | 12/2013 | Robinson | |
| 2014/0366547 | A1 * | 12/2014 | Kraft | F02C 7/10 60/772 |
| 2015/0128597 | A1 * | 5/2015 | Schlak | F03D 13/20 60/719 |
| 2015/0240719 | A1 * | 8/2015 | Kraft | F02C 1/04 290/52 |
| 2016/0010551 | A1 * | 1/2016 | Allam | F02C 7/10 60/772 |
| 2017/0292450 | A1 * | 10/2017 | Kutnjak | F02C 3/04 |
| 2018/0094550 | A1 * | 4/2018 | Conlon | F01K 23/18 |
| 2018/0252158 | A1 * | 9/2018 | Malkamaki | F02C 6/00 |
| 2018/0313269 | A1 * | 11/2018 | Macchia | F02C 7/10 |
| 2019/0301749 | A1 * | 10/2019 | Houssainy | F24D 5/005 |
| 2020/0025379 | A1 * | 1/2020 | Jones | F23R 3/005 |
| 2021/0156308 | A1 * | 5/2021 | Jones | B33Y 80/00 |
| 2021/0388730 | A1 * | 12/2021 | Spain | F02C 9/18 |

FOREIGN PATENT DOCUMENTS

| | | |
|---|---|---|
| JP | 2001-073799 | 3/2001 |
| WO | 2013/124053 | 8/2013 |
| WO | 2017/212211 | 12/2017 |
| WO | 2018/055325 | 3/2018 |

* cited by examiner

COMBINED HEAT AND POWER SYSTEM

This application is the U.S. national phase of International Application No. PCT/GB2019/050371 filed 12 Feb. 2019, which designated the U.S. and claims priority to GB Patent Application No. 1806745.4 filed 25 Apr. 2018, the entire contents of each of which are hereby incorporated by reference.

The present technique relates to the field of combined heat and power systems.

A combined heat and power (CHP) system uses a heat engine to generate both power (which may for example be used to generate electricity or can be used to drive a mechanical system) and useful heat at the same time. For example this can allow waste heat produced in electrical generation power plants to be reused for heating water or other purposes. Another example at a smaller scale can be a CHP system provided within a home or business premises which could, instead of burning fuel merely to heat space or water, also convert some of the energy from the fuel into electricity. It will be appreciated that many other applications of CHP systems are possible. A number of types of heat engine can be used as the basis for the CHP system, for example a gas turbine, an internal combustion engine, or a fuel cell for example.

At least some examples provide a combined heat and power system comprising:

a shaft; a compressor coupled to the shaft to compress intake gas to form compressed gas; a recuperator to heat the compressed gas to form heated compressed gas; a combustor to combust a fuel and the heated compressed gas to form combustion gas; a turbine coupled to the shaft to expand the combustion gas to form exhaust gas; a load coupled to the shaft; an exhaust outlet to expel the exhaust gas to a heater for heating a fluid based on heat from the exhaust gas; a recuperator channel providing a path for the exhaust gas to flow from the turbine to the exhaust outlet through the recuperator; and a bypass channel providing a path for the exhaust gas to flow from the turbine to the exhaust outlet bypassing the recuperator, in which: the recuperator, a casing of the combustor, a casing of the turbine, the exhaust outlet, the recuperator channel and the bypass channel form an integrated mass of consolidated material.

At least some examples provide a component for a combined heat and power system, the component comprising: a recuperator to heat compressed gas received from a compressor to form heated compressed gas; a combustor casing to house a combustor for combusting a fuel and the heated compressed gas to form combustion gas; a turbine casing to house a turbine rotor to form a turbine for expanding the combustion gas to form exhaust gas; an exhaust outlet to expel the exhaust gas to a heater for heating a fluid based on heat from the exhaust gas; a recuperator channel providing a path for the exhaust gas to flow from the turbine to the exhaust outlet through the recuperator; and a bypass channel providing a path for the exhaust gas to flow from the turbine to the heater bypassing the recuperator, in which: the recuperator, the combustor casing, the turbine casing, the exhaust outlet, the recuperator channel and the bypass channel form an integrated mass of consolidated material.

A method for manufacturing the component described above may be provided, where the component is manufactured by additive manufacture.

A computer-readable data structure may be provided representing a design of the component described above. A computer-readable storage medium may store the data structure. The storage medium may be a non-transitory storage medium.

At least some examples provide a computer-implemented method for generating an electronic design file representing a component of a combined heat and power system; the method comprising: generating the electronic design file specifying the component comprising: a recuperator to heat compressed gas received from a compressor to form heated compressed gas; a combustor casing to house a combustor for combusting a fuel and the heated compressed gas to form combustion gas; a turbine casing to house a turbine rotor to form a turbine for expanding the combustion gas to form exhaust gas; an exhaust outlet to expel the exhaust gas to a heater for heating a fluid based on heat from the exhaust gas; a recuperator channel providing a path for the exhaust gas to flow from the turbine to the exhaust outlet through the recuperator; and a bypass channel providing a path for the exhaust gas to flow from the turbine to the heater bypassing the recuperator, in which the recuperator, the combustor casing, the turbine casing, the exhaust outlet, the recuperator channel and the bypass channel form an integrated mass of consolidated material.

Figure 2:
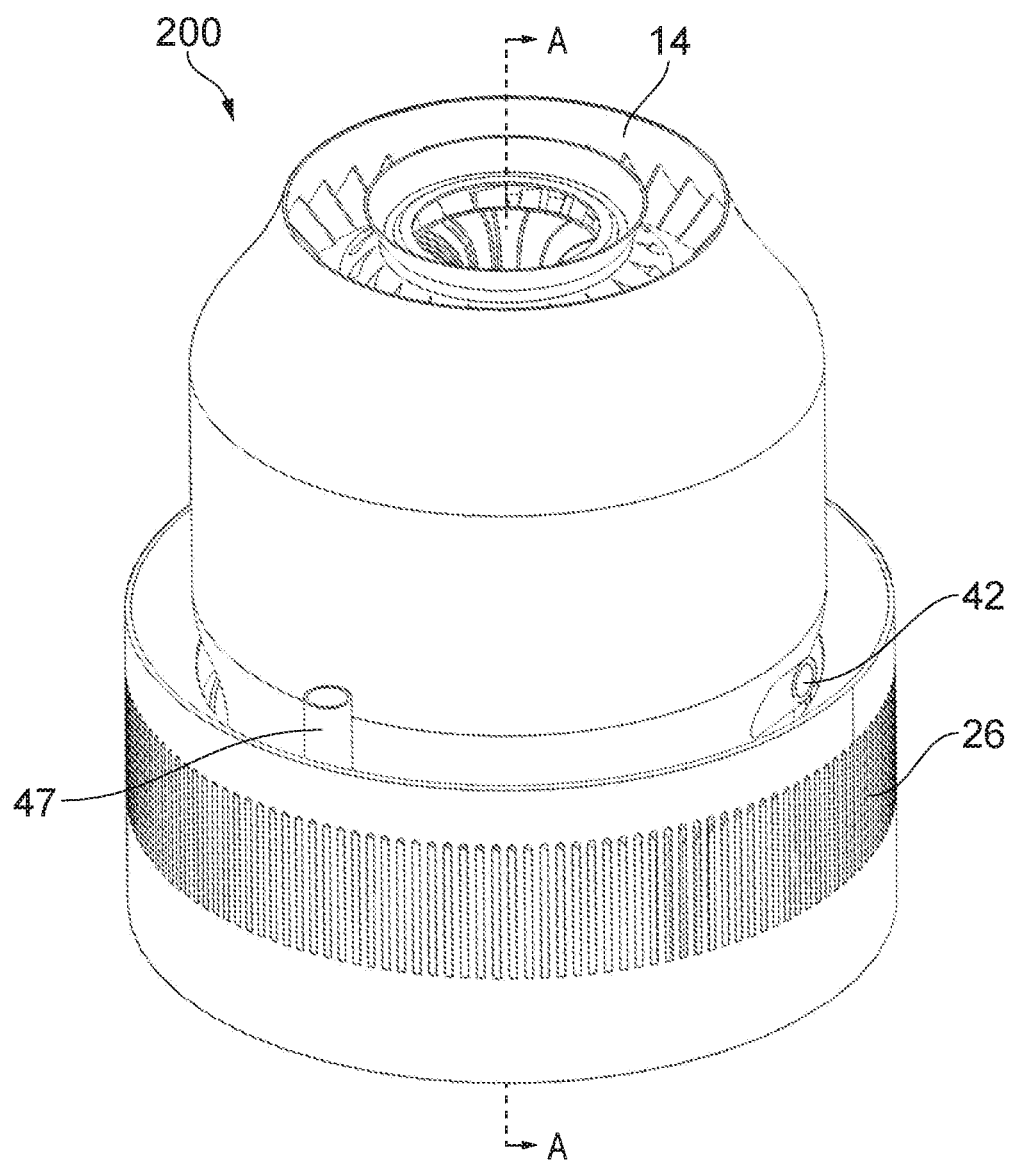
Figure 7:
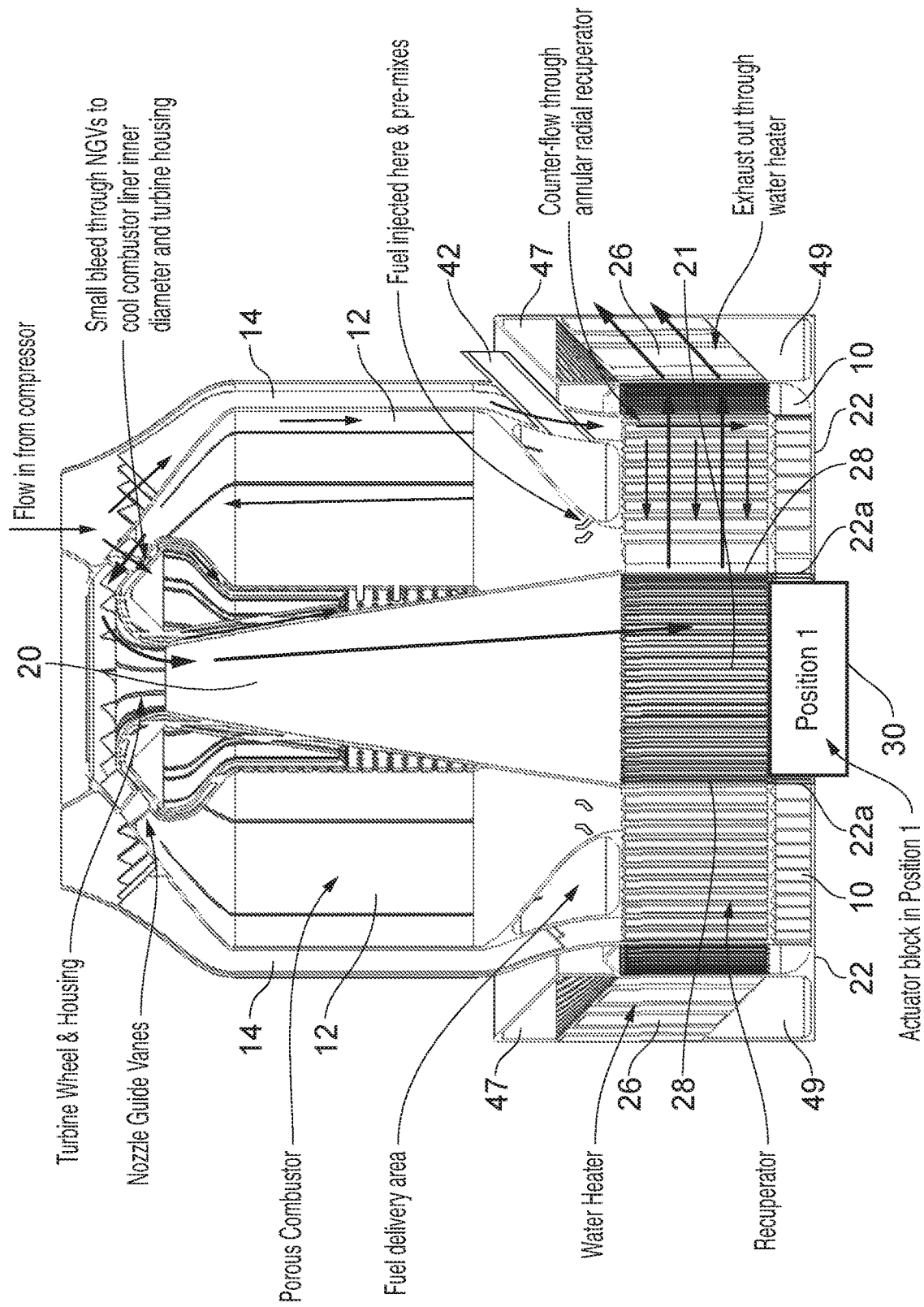
Figure 8:
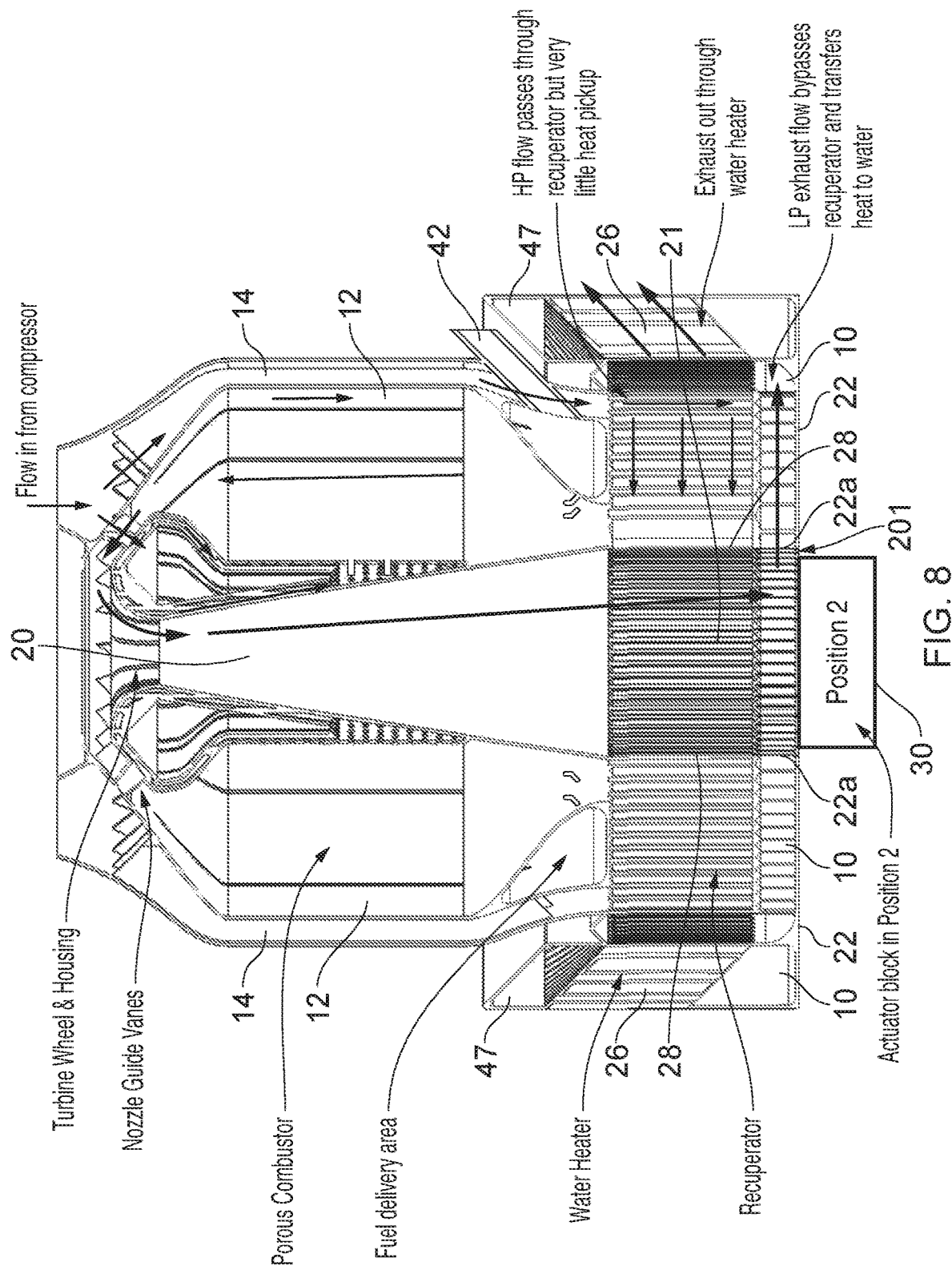
Figure 9:
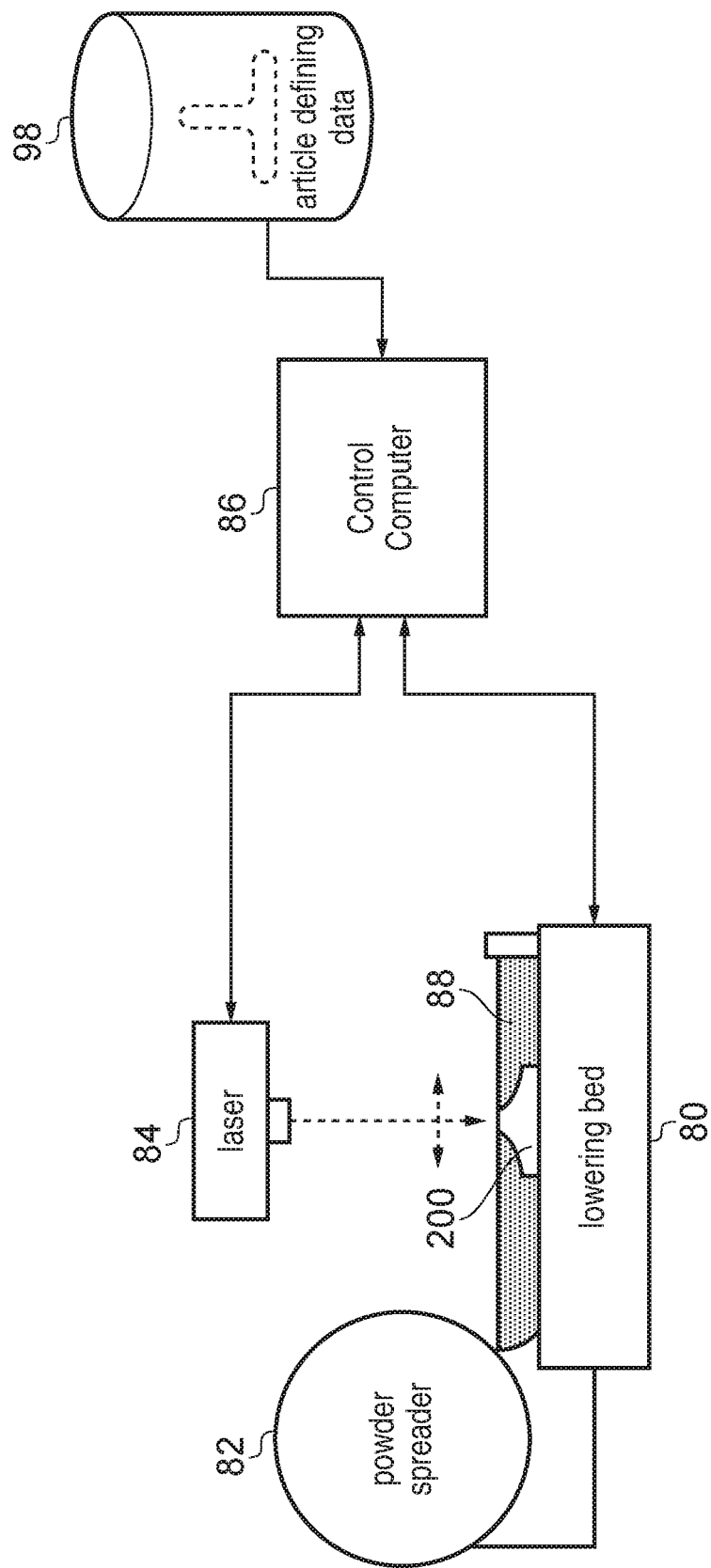

Further aspects, features and advantages of the present technique will be apparent from the following description of examples, which is to be read in conjunction with the accompanying drawings, in which:

FIG. 1 schematically illustrates a combined heat and power system;

FIG. 2 schematically illustrates a component for a combined heat and power system;

FIGS. 3A, 3B and 4 to 6 schematically illustrate various cross sections through a component for a combined heat and power system;

FIGS. 7 and 8 schematically illustrate an example of a component and ratio selector for a combined heat and power system;

FIG. 9 schematically illustrates additive manufacture; and

Figure 10:
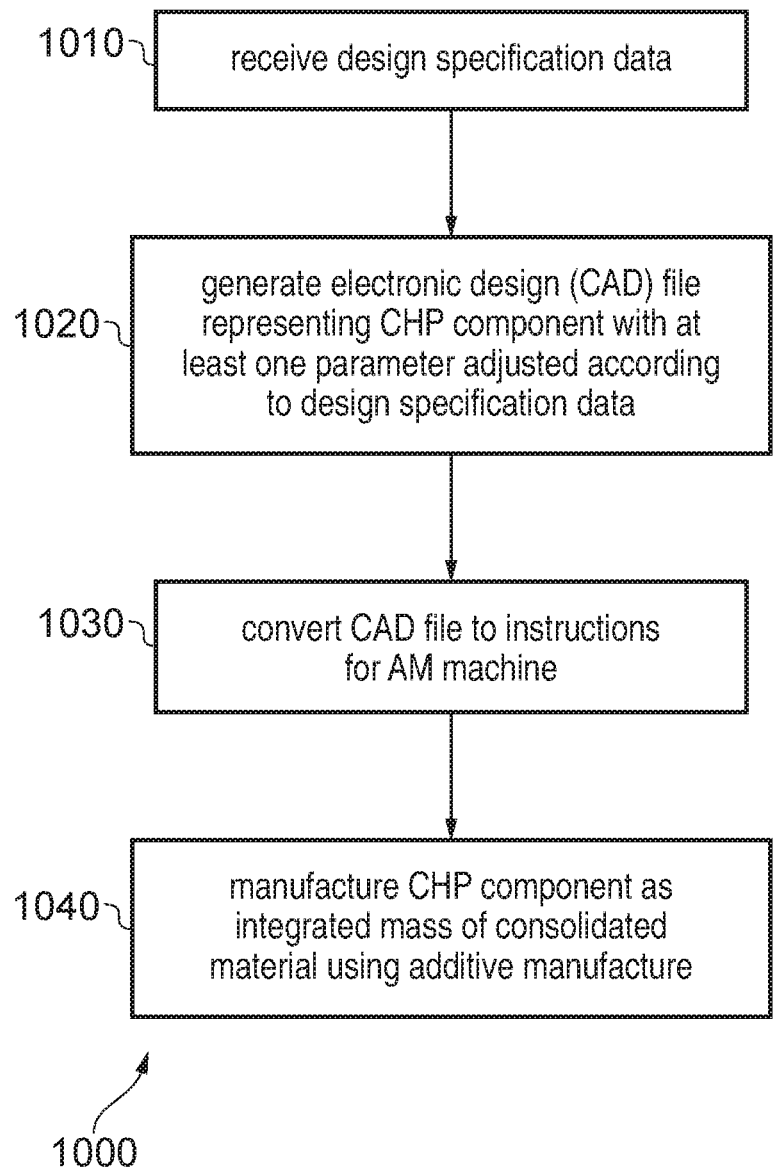

FIG. 10 illustrates a method of generating a component using additive manufacture.

In some CHP systems, a gas turbine engine may be used as the basis for the heat and power generation. For example the CHP system may comprise a shaft, a compressor coupled to the shaft to compress intake gas to form compressed gas, a recuperator to heat the compressed gas to form heated compressed gas, a combustor to combust a fuel and the heated compressed gas to form combustion gas, and a turbine coupled to the shaft to expand the combustion gas to form exhaust gas. A load may be coupled to the shaft. The load may for example be a mechanical load such as a cam, piston or driveshaft driven by the turbine, or could be an electrical generator for generating electricity based on the rotation of the shaft. Hence, when being used in a power generation mode, the combustion of the fuel in the combustor drives the turbine so as to rotate the shaft and hence provide power to drive the load.

The CHP system also has an exhaust outlet to expel the exhaust gas from the turbine to a heater for heating a fluid based on heat from the exhaust gas. Hence, in a heat generation mode, heat from the exhaust gas which results from the combustion of the fuel and the heated compressed gas may be used to heat another fluid (such as air or water), which can then be used to provide useful heat, for example for heating a water supply or the air within a space or building. In some modes of operation, the CHP system may operate in a dual heat/power mode in which both power and heat are being generated simultaneously, although the CHP system may also support single operating modes where only one of heat/power is generated.

In a typical turbine-based CHP system, all the exhaust gas from the turbine would be routed through the recuperator before it reaches the exhaust outlet to the heater. This means the heater is only supplied with any remaining heat once some of the heat has already been used to heat the compressed gas from the compressor to form heated compressed gas which is supplied to the combustor. By using heat from the exhaust gas to heat the compressed gas within the recuperator, this can increase the efficiency of the combustor, as the fuel can be combusted more efficiently when the compressed gas supplied into the combustor is hotter.

In the technique discussed below, the CHP system has both a recuperator channel providing a path for the exhaust gas to flow from the turbine to the exhaust outlet through the recuperator, and a bypass channel providing a path for the exhaust gas to flow from the turbine to the exhaust outlet bypassing the recuperator. Hence, some of the exhaust gas may not flow through the recuperator at all, but instead flows directly to the exhaust outlet and on to the heater without being used to heat the compressed gas within the recuperator. This may seem counter-intuitive since by bypassing the recuperator, this may reduce the efficiency of the combustion by the combustor. However, the inventor recognised that this reduced efficiency of the combustor may be traded off for greater efficiency of heating the fluid at the heater. Hence, providing the additional bypass channel enables a CHP system to control the relative ratio between heat/power generated, to provide greater flexibility. For example, in some applications, it may be preferable to prioritise the heat generation over power generation in at least some operating modes, which may not be possible if all the exhaust gas passes through the recuperator.

In some examples, the amount of exhaust gas passed through the recuperator channel and the bypass channel may be statically configured, so that it is not possible at runtime to vary the ratio between the fraction of exhaust gas passed through the recuperator channel and the fraction of exhaust gas passed through the bypass channel. For example, when designing the CHP system, the relative sizing of the recuperator channel and bypass channel may be selected to provide the desired ratio between the respective portions of exhaust gas passed through each channel. If greater heat generation is desired then the bypass channel could be made larger relative to recuperator channel, while in other systems where a greater portion of the heat is to be used to increase the efficiency of the combustor then the bypass channel could be configured to pass a smaller fraction of the overall flow of exhaust gas through the bypass channel. For example, the geometry of the entrance into the bypass channel could be varied in order to provide different amounts of flow through the bypass channel relative to the recuperator channel.

Other examples may provide a ratio selector to variably adjust a ratio between a first fraction of exhaust gas routed through the recuperator channel and a second fraction of exhaust gas routed through the bypass channel. This allows the user to adjust the amount of heat and power respectively generated by the CHP system depending on their current needs. For example, if the CHP system is used within the home to provide both electrical power generation and hot water, during the winter the user may prefer a greater proportion of the energy to be used for heating water at the heater, with less energy being used for power generation, while in the summer then less energy may be needed for heating water and so more energy could be used to generate electrical power. Hence, by selecting a higher ratio of the first fraction to the second fraction in summer than in winter, this could better accommodate the user's needs. Hence, the ratio selector allows the system to be biased in favour of the heat generation or the power generation as appropriate.

The ratio selector may support at least one operating mode in which both the first fraction and the second fraction are non-zero. Hence, rather than simply operating in a binary on/off manner where either all the exhaust gas is routed through the recuperator channel or all the exhaust gases routed through the bypass channel, the ratio selector may support an intermediate operating point (several different intermediate operating points corresponding to different ratios between the first and second fractions). This provides operating modes in which both heat and power can be generated simultaneously, but with an adjustable ratio between the amount of heat and power output.

A fuel supply controller may be provided to vary a rate of supply of fuel to the combustor depending on the second fraction of the exhaust gas routed through the bypass channel. For example, the fuel supply may control the rate of fuel supply so that the rate of fuel supply is increased as the second fraction increases. When a greater fraction of exhaust gas passes through the bypass channel, the temperature at the recuperator will tend to drop, reducing the efficiency of the combustor and a slight reduction in heat output at the heater which may partially counteract the gain in heat output provided by the bypass channel. In some applications, this drop in heat may be acceptable. However, if the rate of fuel supplied to the combustor is increased then this can increase the temperature of the combustor in order to obtain a desired level of heat output.

For example, the ratio selector may comprise an adjustable barrier to adjust a fraction of an inlet to the bypass channel that is blocked by the barrier. For example the adjustable barrier could be a piston or wall which is moved into position to cover a fraction of the inlet to the bypass channel depending on how much of the exhaust gas is desired to bypass the recuperator channel. This approach can work even if there is no adjustable barrier covering the recuperator channel, since the bypass channel typically has a lower pressure drop than the recuperator channel through the recuperator, and so gas flow will tend to preferentially flow through the bypass channel compared to the recuperator channel when both channels are open. As more of the bypass channel inlet is covered by the barrier, a greater fraction of the exhaust gas passes through the recuperator channel instead.

In one example, the recuperator may comprise an annular heat exchanger arranged in an annulus around an exit of a diffuser for supplying the exhaust gas from the turbine to the recuperator, and the bypass channel may comprise an annular bypass channel extending around the diffuser exit downstream from the recuperator. This arrangement can be compact to manufacture. Also, the adjustable barrier may move in and out of a central aperture of the annular bypass channel to selectively block a portion of the inlet to the bypass channel (the inlet to the bypass channel may extend around the inner diameter of the annular bypass channel). With this approach a relatively small barrier (such as a cylindrical piston moving in and out of the central aperture of the bypass channel) can be used to control the ratio between the fraction of the exhaust gas sent through the recuperator channel and the fraction of the exhaust gas routed through the bypass channel.

A compressor outlet manifold may be provided to supply the compressed gas from the compressor to the recuperator.

The combustor may in some examples be implemented as an annular combustor which extends around at least one of the turbine and the diffuser. In some cases, the compressor outlet manifold may comprise an annular channel which extends around the annular combustor. By locating the compressor outlet manifold around the outside of the annular combustor, this will tend to mean that the compressed gas (which is typically the coolest gas passing through the CHP system as it is not yet reached the combustor or the recuperator) extends through channels provided on the outer extremities of the CHP system. This can be useful especially where the CHP system is to be used in the home or another environment in which the user is likely to come into close contact with the outside of the system. By locating the coolest gas on the outside of the system, this reduces the likelihood that the user may scald themselves on a hot casing of the system. Effectively, the compressor outlet manifold can be used to insulate the user from the hotter combustor.

In some examples, the system may generally have an annular design, in which not only the combustor, but also the compressor outlet manifold, recuperator channel, bypass channel (and in embodiments where the heater is also integrated with the other components, the heater itself) have an annular design, this enables a more compact system so as to reduce the total volume of space required for the system.

However, if the combustor is located internally within the system, then it may not be exposed to the outside ambient air and this can cause issues with overheating. Also, the heat from the combustor may also heat the turbine casing which can cause the turbine casing to expand, allowing more of the combustion gas to leak between the tips of the blades of the turbine rotor and the inside of the turbine casing, reducing efficiency of the turbine. These problems can be addressed by providing a bleed channel from the compressor outlet manifold to direct a portion of the compressed gas along at least one of a casing of the turbine and a casing of the combustor. More particularly, if an annular design of combustor is used, the bleed channel may supply the compressed gas over the surface of the combustor that corresponds to the inner diameter of the annular combustor. By directing a portion of the cooler compressed gas over the casing of the turbine and/or combustor, then this helps to cool these components so as to provide greater efficiency, even if such components are located on the interior of a single integrated component of the CHP system.

However, providing such a bleed channel for directing compressed gas along the casing of the turbine and/or combustor can be challenging as there may also be a need to guide the combustion gas from the combustor to the turbine. The system may include a number of nozzle guide vanes (NGVs) to guide the combustion gas from the combustor to the turbine. For example the NGVs may introduce a tangential component to the flow of combustion gas so that the combustion gas is directed onto a rotor of the turbine tangential to the axis of rotation. The bleed channel used to supply the compressed gas onto the turbine casing and/or combustor casing may comprise one or more cavities which extend through the NGVs. Hence, each NGV may comprise a hollow structure, where the outer surface of each NGV directs the combustion gas from the combustor into the turbine and the inner surface of the NGV guides the compressed gas along the turbine casing and/or combustor casing so as to provide cooling. While such hollow NGVs may be intricate to manufacture, this is possible using additive manufacturing techniques for example, as discussed below.

Hence, while one would normally expect all of the compressed gas from the compressor to be directed to the recuperator and then into the combustor after having passed through the recuperator, when the bleed channel is provided, the portion of the compressed gas that passes through the bleed channel may extend along the casing of the combustor and/or the casing of the turbine in order to cool the combustor/turbine casing. After this, the compressed gas can be reintroduced into the flow of fluid at various points downstream of the bleed channel.

In one example, the bleed channel to expel the portion of the compressed gas which flowed through the bleed channel into the combustor through at least one hole in the casing of the combustor. While one would normally expect the compressed gas to be too cool for efficient combustion, when it has passed along the relatively hot turbine/combustor casing it may be heated, so that it is then hot enough to support efficient combustion without needing to pass through the recuperator. Hence, injecting the flow of bleed fluid into the combustor directly can reduce the complexity of the compressor outlet manifolds and turbine inlet manifolds, for example.

In other examples the flow of compressed gas through bleed channel could be expelled upstream with the combustor, either before or after the recuperator. In another example the bleed channel gas could be injected from the bleed channel into the flow downstream from the combustor but upstream from the turbine. This could be useful for reducing the temperature encountered by diluting the combustion gas with the compressed gas that flowed through the bleed channel, which could help with cooling the turbine.

In some examples, the recuperator, the casing of the combustor, a casing of the turbine, the exhaust outlet, the recuperator channel and the bypass channel may form an integrated mass of consolidated material. Hence, rather than assembling the CHP system from a number of separately manufactured components, each of the recuperator, combustor casing, turbine casing, exhaust outlet, recuperator channel and bypass channel can be formed as a single component, for example by additive manufacture. This can make the overall system more compact.

In some implementations the heater may be provided as a separate component from the integrated material described above. In this case the exhaust outlet could simply expel the exhaust gas which has flowed through either the recuperator channel or the bypass channel to the outside and a separately manufactured duct may then collect the exhaust gas from the exhaust outlet and supply it to a separate header for heating water or another fluid based from the heat from the exhaust gas.

Alternatively, the heater could also be integrated with the other components of the CHP system, so as to be formed as part of the same integrated mass of consolidated material as the recuperator, combustor casing, turbine casing, exhaust outlet, recuperator channel and bypass channel. In this case, the exhaust outlet between the recuperator/bypass channels and the heater may be an internal outlet within the integrated component, rather than an external outlet to a separate duct.

The shaft, the compressor and the rotor of the turbine need not be formed as the same mass of material as the other components discussed above. These can be assembled separately.

In embodiments where the heater is integrated with the other components as discussed above, in some cases the recuperator may comprise an annular heat exchanger arranged in a annulus around an exit of the diffuser, and the heater may comprise a further annular heat exchanger arranged about the circumference of the annular heat exchanger. This arrangement can provide a compact design for handling a given volume flow rate in a relatively space efficient manner.

Other components which could also be integrated with this component discussed above include at least one of: a diffuser for supplying the exhaust gas from the turbine to the recuperator; at least a portion of a compressor outlet manifold for supplying the compressed gas from the compressor to the recuperator; at least a portion of a turbine inlet manifold for supplying the combustion gas from the combustor to the turbine; and at least a portion of a fuel inlet channel for supplying the fuel to the combustor.

In some examples the recuperator channel may pass the exhaust gas through a turn of 90 degrees or less between the turbine and the exhaust outlet. For example, with the annular design the exhaust gas may leave the diffuser in the central aperture of the recuperator, pass through a turn of 90 degrees and then head straight out through the recuperator channel and optionally through the heater without making a further turn. This can be advantageous for efficiency, as avoiding the need for turns of greater than 90 degrees can help reduce the pressure drop through the system.

The component discussed above, which includes within an integrated mass of material the recuperator, combustor casing, turbine casing, exhaust outlet, recuperator channel and bypass channel, may be manufactured and sold as a separate component from other elements of the CHP system, for a downstream party to then assemble into a CHP system together with other components such as the shaft, compressor, load and turbine rotor. In some cases the CHP component may also include one or more of the heater, diffuser, portion of a compressor outlet manifold, portion of a turbine inlet manifold, and portion of a fuel inlet channel as discussed.

The CHP component discussed in any of the examples in this application may be formed by additive manufacture. In additive manufacture, an article may be manufactured by successively building up layer after layer of material in order to produce the entire article. For example the additive manufacture could be by selective laser melting, selective laser sintering, electron beam melting, etc. The material used to form the CHP component can vary, but in some examples may be a metal or alloy, for example aluminium, titanium or steel.

The additive manufacture process may be controlled by supplying an electronic design file which represents characteristics of the design to be manufactured, and inputting the design file to a computer which translates the design file into instructions supplied to the manufacturing device. For example, the computer may slice a three-dimensional design into successive two-dimensional layers, and instructions representing each layer may be supplied to the additive manufacture machine, e.g. to control scanning of a laser across a powder bed to form the corresponding layer. Hence, in some embodiments rather than providing a physical CHP component, the technique could also be implemented in a computer-readable data structure (e.g. a computer automated design (CAD) file) which represents the design of a CHP component as discussed above. Thus, rather than selling the CHP component in its physical form, it may also be sold in the form of data controlling an additive manufacturing machine to form such a CHP component (which can then be manufactured by a downstream party using their own additive manufacture machine). A storage medium may be provided storing the data structure.

Also, a computer implemented method may be provided for generating an electronic design file which represents a CHP component as discussed above. In some cases the method may comprise adjusting at least one parameter of the component according to the design specification data specifying design requirements of the combined heating power system. For example, the design specification data may specify an intended power output for both the heat and power modes and so the computer implemented method may automatically select various parameters of the design based on the level of power required. For example the adjusted parameters may include the overall size of various components of the design and the ratios between the sizes of different elements of the design. For example, the at least one parameter could comprise at least one of: a ratio between a hydraulic diameter of the recuperator channel and a hydraulic diameter of the bypass channel; a frontal area of the recuperator; a flow length of the recuperator; a size of the turbine casing; a size of the combustor casing; and a size of the heater.

For example, by adjusting ratio of the hydraulic diameter of the recuperator channel and the hydraulic diameter of the bypass channel, this can enable adjustment of the relative amount of heat and power generated by the system, as in general a wider bypass channel may allow more of the energy to be used for the heat than for power, and on the other hand a narrower bypass channel relative to the recuperator channel may allow the operating point to be biased towards the power mode.

More generally, any parameter which controls the mass flow through the CHP system could be adapted based on the design specification data. For example, the frontal area of the recuperator, the turbine housing size, the combustor frontal area, or the fuel delivery passage sizes, could all be adjusted. Also the parameters which affect the recuperator efficiency, such as the frontal area and flow length of the recuperator channels can be varied. Also the size of the heater can be varied.

The techniques discussed above can be applied to any CHP system. However, they may be particularly useful for smaller scale CHP systems, for example micro-CHP systems or CHP systems with a maximum power output of 100 kW or less, as the design of the CHP component discussed above provides a particularly compact design of the system suitable for such applications.

FIG. 1 schematically illustrates a combined heat and power (CHP) system 2. The combined heat and power system 2 comprises a rotatable shaft 4 upon which are mounted a compressor 6 and a turbine 8. A load 24 may be coupled or attached to the shaft 4. The combined heat and power system 2 also includes a recuperator 10 and a combustor 12.

In operation, rotation of the compressor 6 and the turbine 8 at high speed upon the shaft 4 draws in intake gas, such as air, into the compressor 6 where it is compressed to form compressed gas. The flow of compressed gas out from the compressor 6 has a radial component outward from the shaft 4 and a rotational component around the shaft 4. The compressed gas flows out of the compressor 6 and is supplied into the recuperator 10 where it is further heated to form heated compressed gas. The further heating to form the heated compressed gas within the recuperator 10 may be achieved by heat exchange with exhaust gas which is also routed through the recuperator 10 in different channels (i.e. the recuperator 10 is a heat exchanger). The flow of gas out of the recuperator 10 may be controlled by controlling the duct shape within at least the final portion of the recuperator 10 to impart swirl in the flow of gas so as to assist in efficient combustion of fuel injected into the combustor 12.

The heated compressed gas exiting the recuperator 10 enters the combustor 12 where it is mixed with fuel (e.g. a combustible liquid or gas) and serves to support combustion so as to generate high temperature combustion gas which is directed out from the combustor 12 and enters the turbine 8. The combustion gas entering the turbine 8 is expanded as it passes through the turbine 8 to extract work therefrom to form exhaust gas. The turbine 8 thus drives the rotation of the compressor 6 and any load 24 attached to the shaft 4, for example an electrical generator or a mechanical offtake such as a transmission or gearbox.

The CHP system 2 comprises a recuperator channel 28 providing a path for the exhaust gas to flow from the turbine 8 to the exhaust outlet 18 through the recuperator 10, where the heat from the exhaust gas heats the compressed gas from the compressor 6 prior to the heated compressed gas reaching the combustor 12. The CHP system 2 also comprises a bypass channel 22 providing a path for the exhaust gas to flow from the turbine to the exhaust outlet bypassing the recuperator 10. The exhaust outlet 18 is configured to expel the exhaust gas to a heater 26 for heating a fluid, such as water, based on the heat from the exhaust gas.

The CHP system 2 may also comprise a ratio selector 30 to variably adjust a ratio between a first fraction of the exhaust gas routed through the recuperator channel 28 and a second fraction of the exhaust gas routed through the bypass channel 22. It will be appreciated that the ratio selector 30 is not essential, and that in some systems the ratio described above could be set statically at the time of designing the system, for example by selecting the relative cross-sectional areas of the recuperator channel 28 and bypass channel 22. In some examples the ratio selector 30 comprises an adjustable barrier to adjust a fraction of an inlet to the bypass 22 channel that is blocked by the adjustable barrier. For example, when the adjustable barrier is fully covering the inlet to the bypass channel 22, the fraction of the exhaust gas route through the bypass channel (the second fraction) is substantially zero, and the fraction of the exhaust gas routed through the recuperator channel (the first fraction) is 1, such that the ratio is also 1. In some examples the ratio selector is configured to support at least one operating mode in which both the first fraction and the second fraction are non-zero, for example ½ and ½ or ¼ and ¾. In these examples, the ratio then has a value between zero and one.

A fuel supply controller 13 may be provided to control the supply of fuel to the combustor 12. The fuel supply controller 13 may in some embodiments provide a constant rate of fuel supply regardless of the operating mode of the CHP system. However, in other embodiments the fuel supply controller 13 may vary the rate of fuel supplied to the combustor 12. In embodiments including the ratio selector 30, the rate of fuel supply may depend on the second fraction of exhaust gas routed through the bypass channel. For example, the rate of fuel supply may be higher when the second fraction is higher than when the second fraction is lower. This can help to maintain a desired level of heat output by supplying more fuel to counteract the slight drop in combustion efficiency caused by increasing the fraction of exhaust flow through the bypass channel.

Figure 3A:
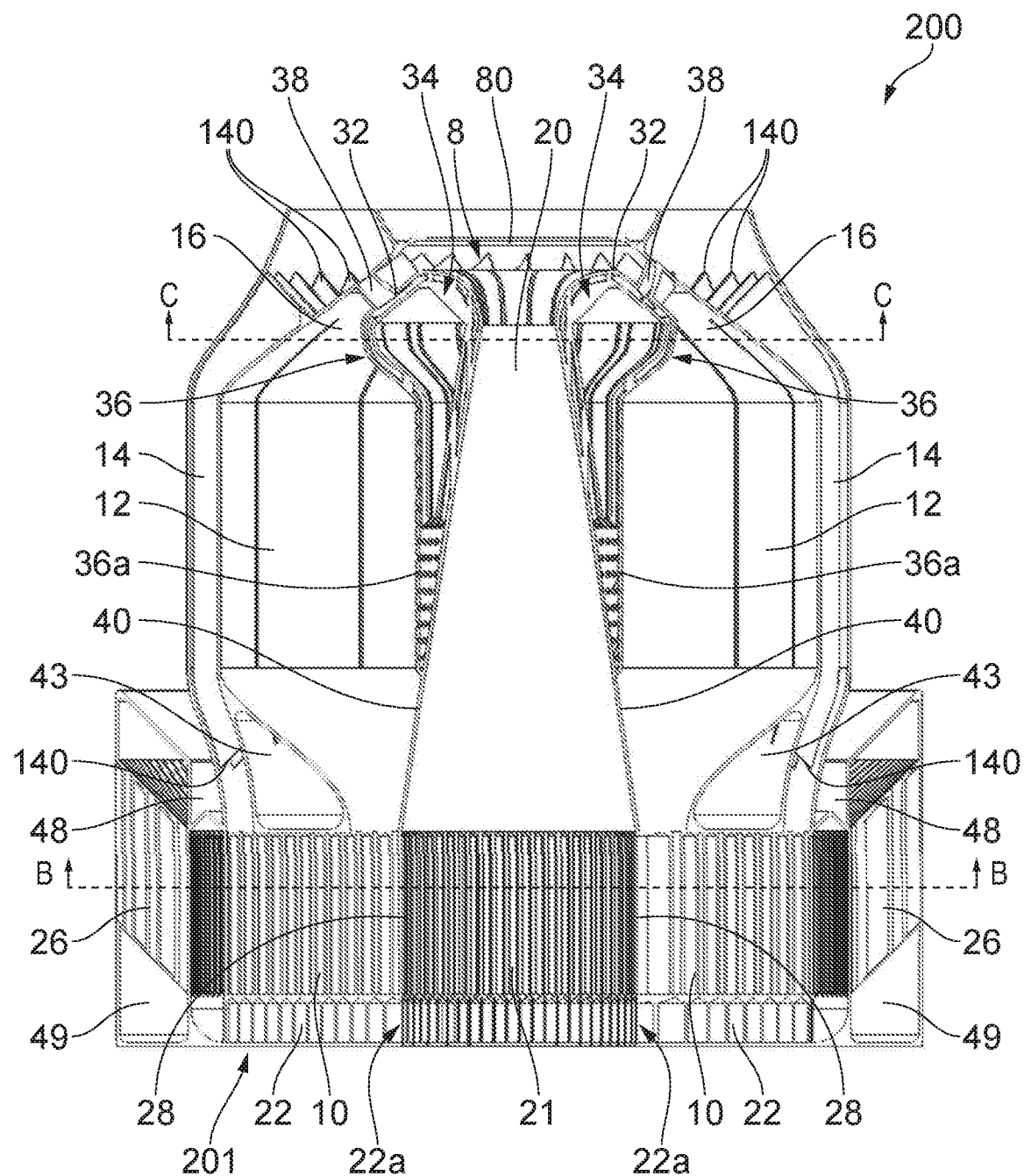

FIGS. 2, 3A, 3B and 4 to 6 illustrate a CHP component 200 for use in the CHP system. FIG. 3A illustrates a cross-section through the CHP component 200 shown in FIG. 2 along a central axis of the component (along section line A in FIG. 2). In this example, the CHP component 200 includes a casing of the turbine 8 (turbine casing 34), a casing of the combustor 12 (combustor casing 36), the recuperator 10, the recuperator channel 28 and bypass channel 22, the exhaust outlet 18, and the heater 26. Hence, in this example the exhaust outlet is an intermediate outlet within the body of the CHP component 200 (at the inlet to the heater 26). Other examples could use an external heater which is separate from the other components, in which case the exhaust outlet 18 may be the point at which the exhaust gas leaves the CHP component and passes through an external duct to the heater. The water to be heated by the heater 26 may be supplied into the heater through a water inlet 47 as shown in FIG. 2, which supplies the water to a circumferential (annular) channel 48 passing around the circumference of the CHP component as shown in FIG. 3A. Similarly, the heated water may leave the heater 26 through an annular water outlet channel 49 shown in FIG. 3A, which may gather the hot water from around the annular heater 26. The hot water may be tapped out from the annular water outlet channel 49 at a single water outlet extending from the channel 49 (not visible in the views shown in FIGS. 2 to 6).

Figure 3B:
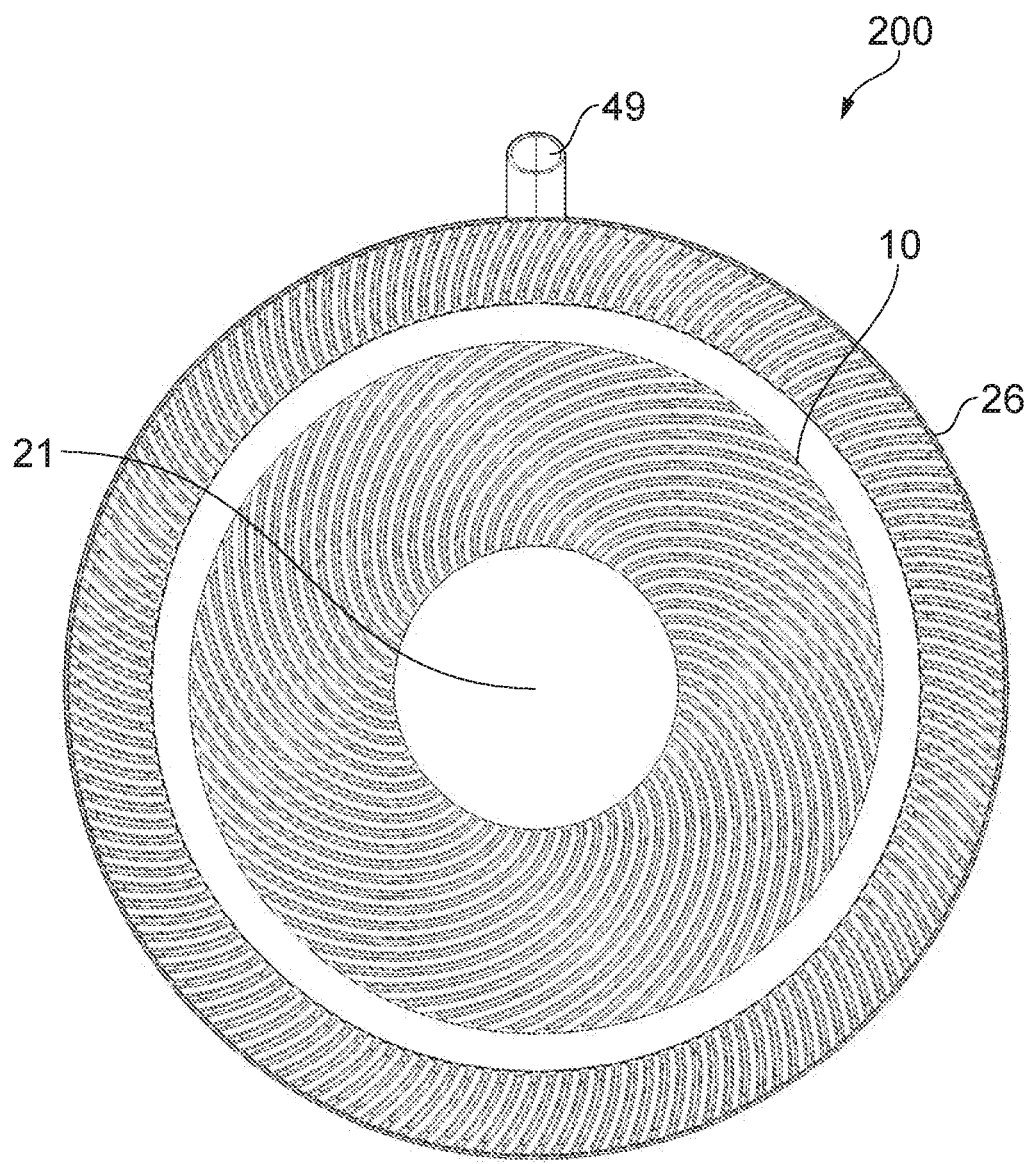

FIG. 3B illustrates a cross-section through the CHP component 200 shown in FIG. 2 across the diameter of the component (along section line B in FIG. 3A). As shown in FIGS. 3A and 3B, the recuperator 10 may comprise an annular heat exchanger arranged in an annulus around an exit of a diffuser 20 (i.e. the diffuser 20 expels the exhaust gas into the central aperture 21 of the recuperator 10). The diffuser 20 is configured to supply the exhaust gas from the turbine 8 to the recuperator 10. The use of the diffuser 20 facilitates establishing a greater pressure drop across the turbine 8 enabling more work to be extracted from the combustion gas whilst having the exhaust gas at a pressure suitable for discharge to the atmosphere. In some examples the combined heat and power system 2 comprises a turbine inlet manifold 16 for supplying the combustion gas from the combustor to the turbine. The recuperator channel 28 is also configured to pass the exhaust gas through a turn of 90 degrees or less between the turbine and the exhaust outlet. Although the channels through the recuperator 10 appear to extend vertically in FIG. 3A, this is an artefact of the cross-section, and it can be seen from FIG. 3B that in fact the channels have both a radial and a tangential component so that they direct the exhaust gas in curved paths from the inner aperture 21 of the recuperator to the outer circumference of the recuperator 10 (or direct compressed gas in curved paths from the outer circumference of the recuperator 10 towards the inner aperture 21 ready for supply to the combustor 12).

As shown in FIG. 3A, the bypass channel 22 comprises an annular bypass channel extending around the exit of the diffuser 20 downstream from the recuperator 10. In some examples the ratio selector 30 comprises an adjustable barrier (e.g. a piston) configured to move in and out of the inner aperture 21 of the recuperator 10 to selectively block a portion of the inlet 22a to the annular bypass channel 22.

The CHP component 200 may also comprise a compressor outlet manifold 14 to supply the compressed gas from the compressor 6 to the recuperator 10. In some examples, the combustor 12 comprises an annular combustor extending around at least one of the turbine 8 and the diffuser 20. The compressor outlet manifold 14 then comprises an annular channel extending around the annular combustor 12, but this is not essential. For example, the compressor outlet manifold 14 may comprise a plurality of compressor outlet manifold ducts circumferentially arranged around the combustor 12 (e.g. in a plane perpendicular to the shaft 4). Additionally, flow directing vanes 140 or other flow directing structures may be provided within at least the first portion of the compressor outlet manifold 14, to subdivide the channel. Hence, in general the terms "channel", "manifold", "duct", etc. in this application may refer to either a single channel or to multiple sub-divided channels which convey different portions of the fluid. The compressed gas flowing through the compressor outlet manifold 14 can be used to cool the external surface of the combustor 12. It will also be appreciated that other configurations of combustor 12 may be used in the CHP component 200, such as a can combustor or a cannular combustor.

The CHP component 200 comprises a combustor casing 36 to house the combustor 12 and a turbine casing 34 to house a turbine rotor (not shown in FIG. 3A) to form the turbine 8. The CHP component 200 may also comprise a bleed channel 32 from the compressor outlet manifold 14 to direct a portion of the compressed gas along at least one of the turbine casing 34 and the combustor casing 36. Thus, heat may be transferred from the turbine casing 34 to the compressed gas in a way which increases the efficiency of the turbine 8. For example, since the turbine casing 34 expands more than the turbine rotor in use, the gap between the turbine rotor and the turbine casing 34 is increased, thereby reducing the efficiency of the rotor. By transferring heat from the turbine casing 34 to the compressed gas, the turbine casing expands less in use, and therefore the gap between the turbine rotor and the turbine casing 34 is reduced, improving efficiency. Furthermore, removing heat from the turbine casing 34 by cooling it with the compressed gas may ease design constraints upon the turbine casing 34, such as, for example, allowing a less expensive material to be used for the turbine casing 34 as its peak temperature will be less.

More particularly, the bleed channel 32 may be configured to supply the compressed gas over the surface of the combustor casing 36 that corresponds to the inner diameter of the annular combustor 12. The CHP component 200 may also comprise a plurality of nozzle guide vanes 38 to guide the combustion gas from the combustor 12 to the turbine 8. The bleed channel 32 then comprises one or more cavities extending through the nozzle guide vanes 38 in order to direct the portion of the compressed gas along the combustor casing 36, for example along the surface of the combustor casing 36 that corresponds to the inner diameter of the annular combustor 12. In some examples the bleed channel 32 is configured to expel said portion of the compressed gas into the combustor 12 through at least one hole 36a in the combustor casing 36. For example, the one or more holes 36a may be located on the surface of the combustor casing 36 that corresponds to the inner diameter of the annular combustor 12.

In some examples, the recuperator 10, the combustor casing 36, the turbine casing 34, the exhaust outlet 18, the recuperator channel 28 and the bypass channel 22 form an integrated mass of consolidated material. In some examples the heater 26 is also part of the integrated mass of consolidated material. For example, the recuperator 10 may comprise an annular heat exchanger arranged in an annulus around an exit of the diffuser 20. The heater 26 then comprises a further annular heat exchanger arranged about the circumference of the annular heat exchanger. The diffuser 20, at least a portion of the compressor outlet manifold 14 and at least a portion of the turbine inlet manifold 16 may also form part of the integrated mass of consolidated material. The integrated mass of consolidated material may also comprise at least a portion of a fuel inlet channel 42 for supplying the fuel to the combustor 12 (under control of the fuel supply controller 13 which may be a separate component from the integrated CHP component 200). The fuel inlet channel 42 may supply the fuel into an annular fuel distribution channel 43 which passes around the circumference of the component 200. Fuel from the distribution channel 43 is injected into the combustor.

An advantage of forming the heat exchangers for the recuperator 10 and heater 18 at the bottom of the integrated component as shown in FIG. 3A, is that these elements require the most metal and so are the heaviest (due to the additional mass of the walls which divide the heat exchanger channels), and so by locating these on the same side of the component, this can make manufacture of the component by additive manufacture more straightforward, as it is not necessary for other parts of the component to bear the weight of the heat exchangers during manufacture. The component can be manufactured in a build direction from bottom to top as viewed in FIG. 3A, so that the bypass channel 22 and heat exchanger components 10, 18 are laid down first and then the less dense portions corresponding to the combustor 10, turbine casing 34 etc. are laid down on top of the heat exchanger components.

Figure 4:
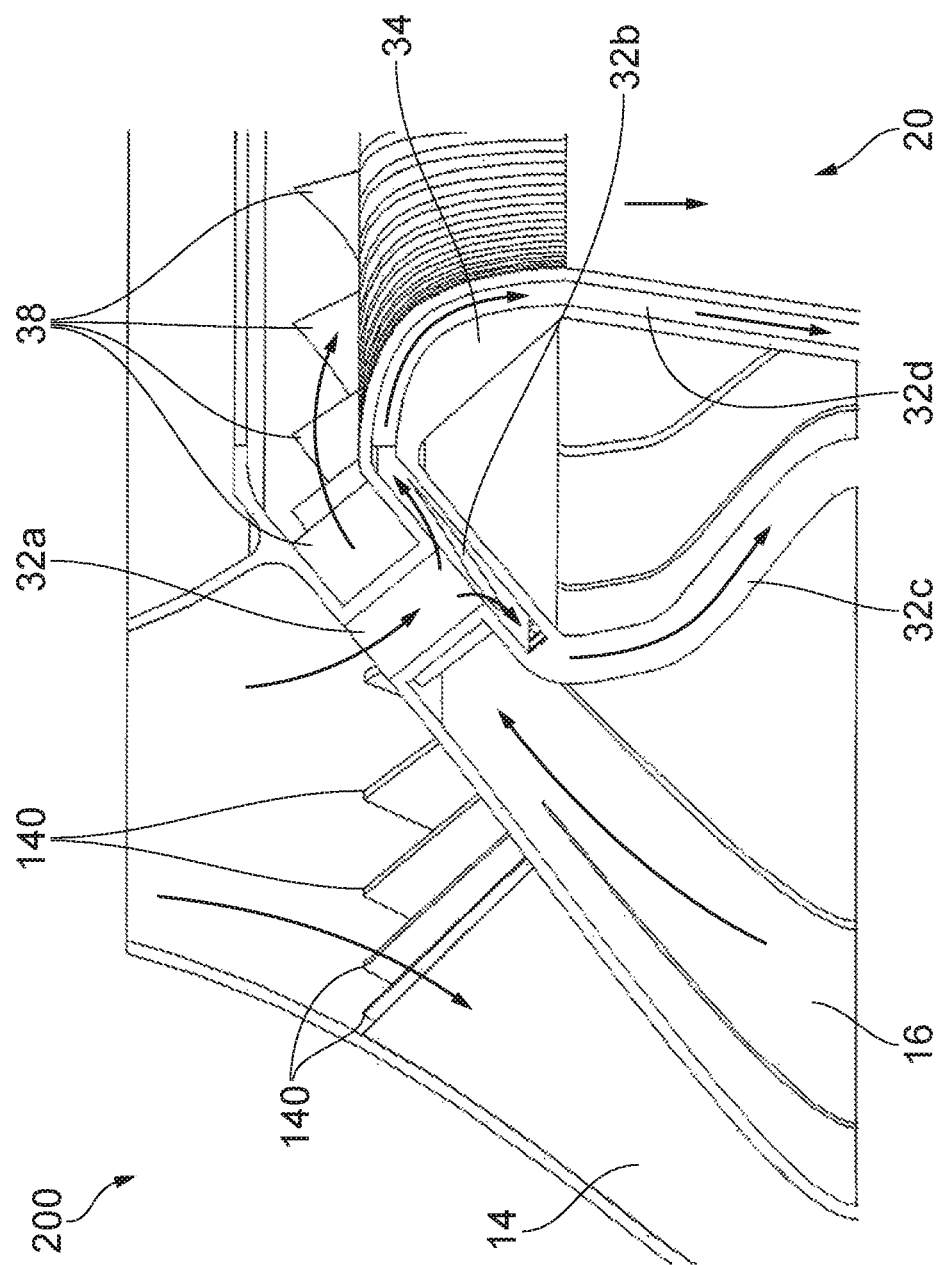
Figure 5:
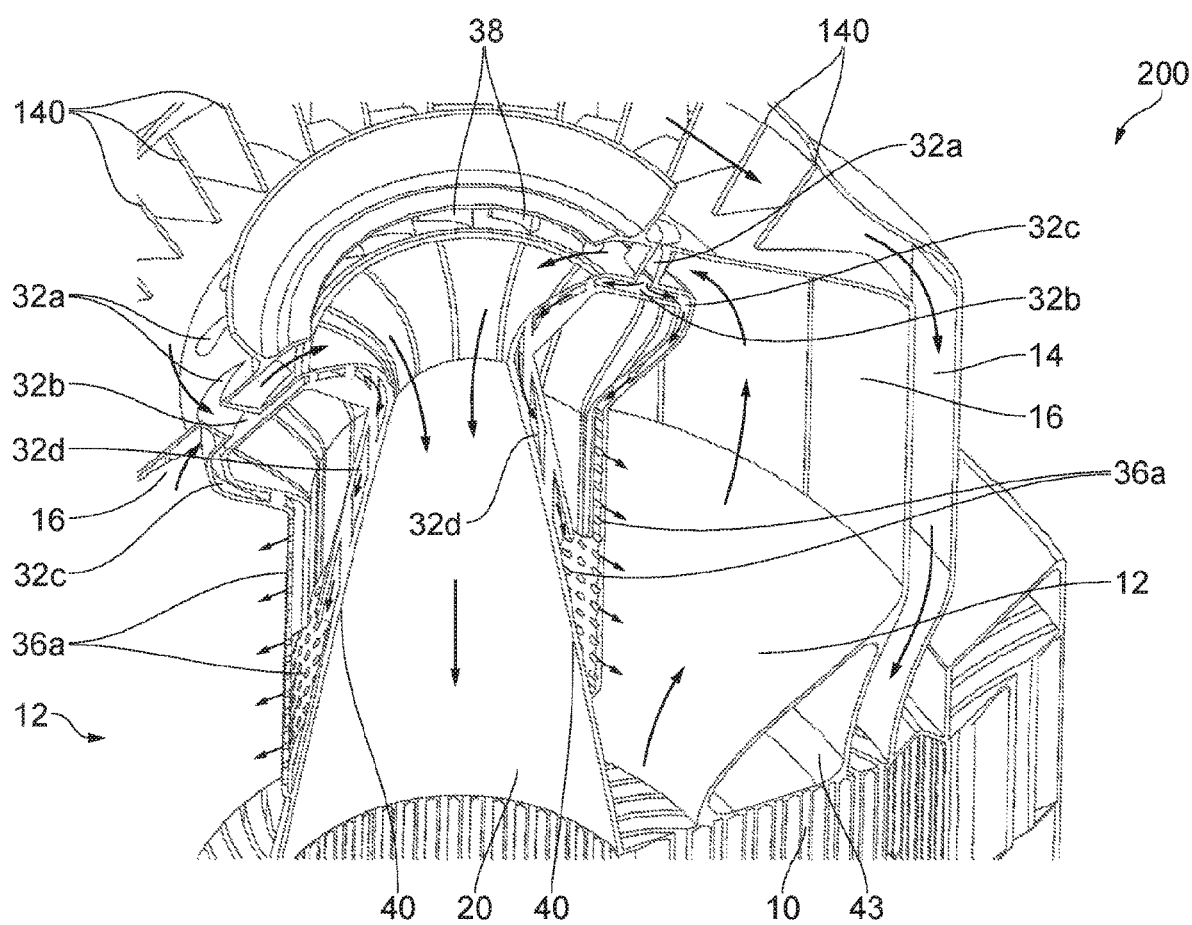

FIGS. 4 and 5 schematically illustrate the same cross section through the CHP component 200 as shown in FIG. 3A, but zoomed in on the turbine inlet manifold 16 and the first portion of the compressor outlet manifold 14 (FIG. 5 shows the cross-section in perspective while FIG. 4 shows an end-on view). The arrows show the direction the different fluids flow through the component. As described above in relation to the CHP system 2, the compressed gas from the compressor enters the CHP component 200 through the compressor outlet manifold 14. The compressor outlet manifold 14 comprises flow directing vanes 140 to direct the compressed gas around the outside of the combustor 12 whilst reducing the swirl and circumferential flow of the compressed gas. As illustrated in FIG. 3A, the flow directing structures 140 may extend along the majority of the length of the compressor outlet manifold 14 to form a plurality of compressor outlet manifold ducts circumferentially arranged around the combustor 12. This ensures an even distribution of compressed gas around the circumference of the combustor 12 whilst further reducing the circumferential flow of the compressed gas. Alternatively, the flow directing vanes 140 may be entirely contained within a first portion of the compressor outlet manifold 14, for example the portion visible in FIG. 4. In some examples, one or more of the flow directing structures 140 may be hollow, for example in order to allow one or more fuel inlet channels 42 to pass through the flow directing structures 140 in order to supply the fuel to the combustor 12. The flow directing structures 140 can also provide mechanical support enabling other parts of the CHP component 200 to be formed on top of lower parts of the component when the component is made by additive manufacture.

As described above in relation to the combined heat and power system 2, the compressed gas flows from the compressor outlet manifold into the recuperator 10, where it is heated, and then flows into the combustor 12, where it is mixed with fuel to generate high temperature combustion gas. Although in the examples described above the fuel is supplied directly into the combustor 12 (via the fuel inlet channel 42 and fuel distribution channel 43) this is not essential. For example, at least a portion of the fuel may be added to the compressed gas upstream of the combustor 12, for example in the compressor outlet manifold 14. At least a portion of the fuel may be added further upstream than the compressor. In such examples, the fuel and compressed gas mixture is only ignited upon entry into the combustor 12.

The combustion gas then flows out of the combustor 12 into the turbine inlet manifold 16. In the example illustrated in FIGS. 4 and 5, the turbine inlet manifold 16 comprises a plurality of nozzle guide vanes 38 to guide the combustion gas from the combustor 12 to the turbine 8.

A portion of the compressed gas entering the CHP component 200 through the compressor outlet manifold 14 is directed into bleed channels 32 to form bleed gas. In the example illustrated in FIGS. 4 and 5, the bleed channels 32 comprise one or more cavities 32*a* extending through the nozzle guide vanes 38 allowing the bleed gas (compressed gas) to flow through the interior of the nozzle guide vanes 38. This also acts to remove heat from the nozzle guide vanes 38, improving their structural integrity and service life since the external surfaces of the nozzle guide vanes 38 are exposed to the hot combustion gas.

The cavities 32*a* extending through the nozzle guide vanes 38 direct the portion of the compressed gas into a bleed duct 32*b* which forms part of the bleed channels. The bleed duct 32*b* is arranged in an annulus around the turbine 8 such that the compressed gas which flows through each of the cavities 32*a* in the nozzle guide vanes 38 flows into a single bleed duct 32*b*. This ensures an even distribution of bleed gas around the circumference of the turbine 8.

The bleed gas is directed from the bleed duct 32*b* into two manifolds, the combustor casing bleed manifold 32*c* and the turbine casing bleed manifold 32*d*. The combustor casing bleed manifold 32*c* is a flow passage formed internal to the inner diameter of the annular combustor casing 36 in order to direct the portion of the bleed gas (i.e. compressed gas) along the combustor casing 36. In other words, the combustor casing bleed manifold 32*c* forms a separate inner combustor lining in the combustor casing 36 through which the bleed gas can flow. Alternatively, the bleed gas may be directed so as to impinge directly onto the combustor casing 36. The turbine casing bleed manifold 32*d* is a flow passage formed internal to the outer diameter of the turbine casing and the outer diameter of the annular diffuser casing 40 in order to direct the portion of the bleed gas (i.e. compressed gas) along the turbine casing 34 and the diffuser casing 40. As described above, this helps remove heat from the turbine casing and improves the efficiency of the turbine. It will be appreciated that it is not essential to have both the combustor casing bleed manifold 32*c* and the turbine casing bleed manifold 32*d*, and in some examples the bleed channels 32 will comprise only the combustor casing bleed manifold 32*c* or the turbine casing bleed manifold 32*d*.

Figure 6:
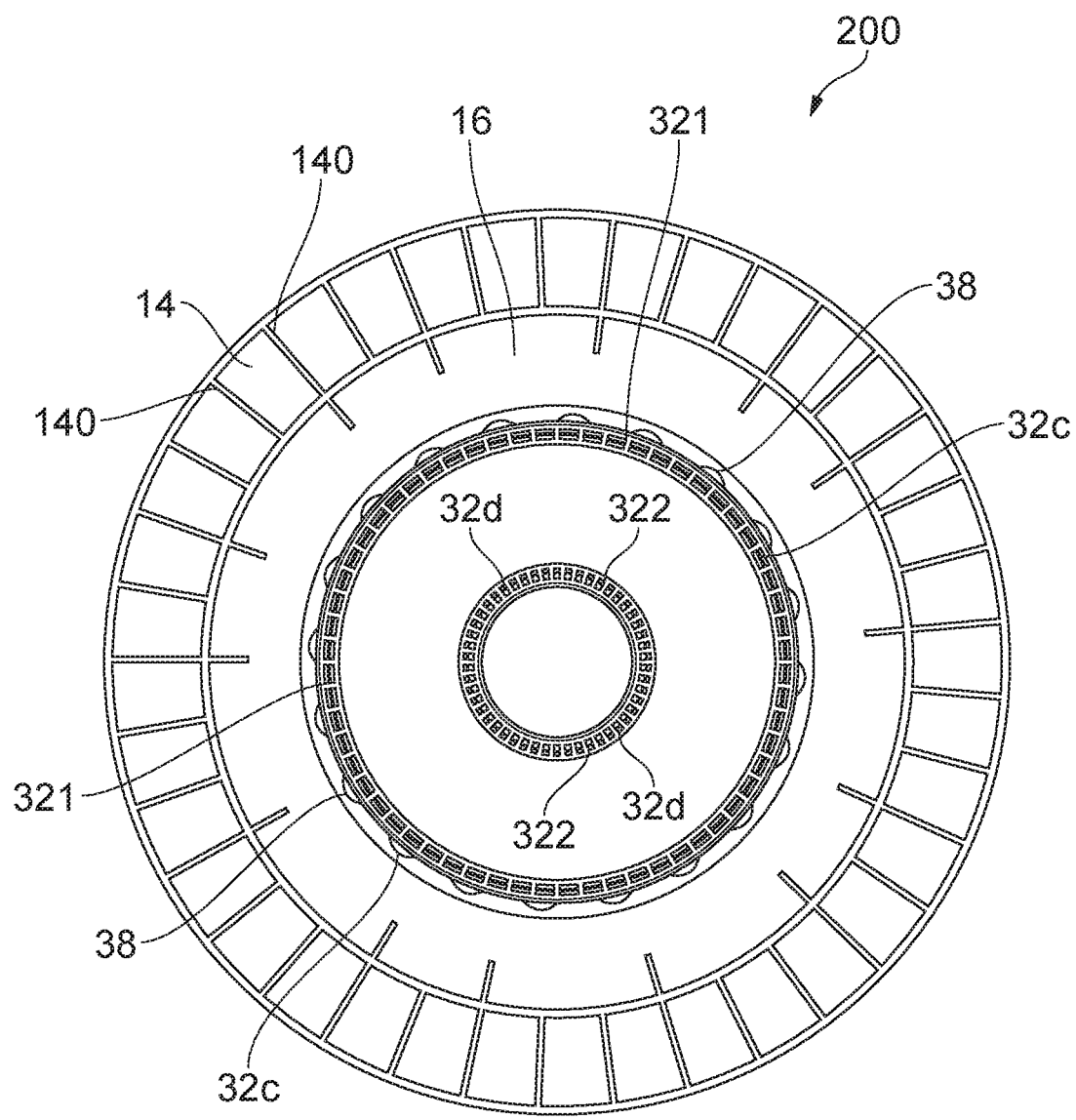

In a similar fashion to the flow directing structures 140 in the compressor outlet manifold, the combustor casing bleed manifold 32*c* and/or the turbine casing bleed manifold 32*d* may comprise one or more flow directing structures 321, 322 at the entrance to the combustor casing bleed manifold 32*c* and the turbine casing bleed manifold 32*d* respectively in order to direct the bleed gas around into the respect bleed manifold whilst reducing the swirl and circumferential flow of the bleed gas. The flow directing structures 321 may extend along the majority of the length of the combustor casing bleed manifold 32*c* to form a plurality of combustor casing bleed manifold ducts circumferentially arranged around the combustor casing 36. In a similar fashion, the flow directing structures 322 may extend along the majority of the length of the turbine casing bleed manifold 32*d* to form a plurality of turbine casing bleed manifold ducts circumferentially arranged around the turbine casing 34 and the diffuser casing 40. This is illustrated in FIG. 6, which illustrates a cross section through the same CHP component 200 as shown in FIGS. 2 to 5 across the diameter of the component (along section line C in FIG. 3A). FIG. 6 shows the compressor outlet manifold 14 separated into a plurality of compressor outlet manifold ducts by a plurality of flow directing structures 140. The combustor casing bleed manifold 32*c* is separated into a plurality of combustor casing bleed manifold ducts by the flow directing structures 321 and the turbine casing bleed manifold 32*d* is separated into a plurality of turbine casing bleed manifold ducts by the flow directing structures 322. Although FIG. 6 shows each of the flow directing structures 140, 321, 322 evenly distributed around the annulus form by the compressor outlet manifold 14, the combustor casing bleed manifold 32*c* and the turbine casing bleed manifold 32*d* respectively, this is not essential and it will be appreciated that any distribution of flow directing structures 140, 321, 322 may be possible. As stated above, the flow directing structures 140, 321, 322 can also provide mechanical support required for allowing other parts of the CHP component 200 to be formed on top of lower parts of the component when the component is made by additive manufacture.

The portion of the bleed gas which flows through the combustor casing bleed manifold 32*c* exits the combustor casing bleed manifold 32*c* (and the bleed channels 32) through one or more holes 36*a* located on the surface of the combustor casing 36 corresponding to the inner diameter of the annular combustor 12. As illustrated in FIG. 5, the holes 36*a* may be formed into a grid of holes 36*a* to evenly distribute the bleed gas around the internal circumference of the combustor 12 and along a portion of the length of the combustor 12. As illustrated in FIG. 3A, the grid of holes 36*a* may extend along the entire length of the combustor 12, ensuring that the entire internal surface of the combustor casing 36 is cooled by the bleed gas, or could only extend along a portion of the combustor casing. This also ensures an even distribution of the bleed gas into the combustor 12, which enhances mixing of the bleed gas, heated compressed gas and fuel, thus improving the combustion efficiency.

The portion of bleed gas which flows through the turbine casing bleed manifold 32*d* flows along the turbine casing 34 and the diffuser casing 40 and exits into the combustor casing bleed manifold 32*c* as a position along the length of the combustor casing 36. This portion of the bleed gas is then able to flow through the grid of holes 36*a* into the combustor as described above. The turbine casing bleed manifold 32*d* may join the combustor bleed manifold 32*c* at a different location, for example at a portion of the combustor casing 36 corresponding to the turbine inlet manifold 16 or at the inlet to the combustor 12 from the recuperator 10. The location that the turbine casing bleed manifold 32*d* joins the combustor casing bleed manifold may be selected to ensure that substantially the same mass flow of bleed gas is achieved through each of the holes 36*a*, thereby ensuring that no combustion gas passes from the combustor 12 into any of the bleed channels 32.

It will be appreciated that it is not essential to expel the bleed gas into the combustor 12. For example, the bleed gas may be expelled upstream of the combustor 12, for example into a manifold between the recuperator 10 and the combustor 12, in order to mix the bleed gas with the heated compressed gas before entering the combustor 12. Alternatively or in addition, the bleed gas could be expelled downstream of the combustor 12, for example in the turbine inlet manifold 16, in order to dilute the combustion gas prior to entering the turbine 8 in order to reduce the temperature of the gas entering the turbine. For example, the one or more cavities 32a extending through the nozzle guide vanes 38 could be configured to expel the bleed gas out of a slot in the trailing edge of the nozzle guide vanes 38, or one or more holes on the surface of the nozzle guide vanes 38, in order for bleed gas to be able to flow into the turbine inlet manifold 16.

FIGS. 7 and 8 schematically illustrates the same cross section through the CHP component 200 as shown in FIG. 3A and the ratio selector 30 as described above in relation to the CHP system 2. In the example illustrated in FIGS. 7 and 8, the ratio selector 30 is separate from the CHP component 200 and comprises an adjustable barrier to adjust a fraction of the inlet 22a to the bypass channel 22 that is blocked by the adjustable barrier. Although the ratio selector 30 is separate from the CHP component 200, at least one of the ratio selector 30 and the CHP component 200 may comprise a fluidic seal, such as an O-ring or piston ring, in order to prevent fluid such as the exhaust gas from leaking between any gaps between the ratio selector 30 and the CHP component 200. FIG. 7 shows the ratio selector 30 in a first position whilst FIG. 8 shows the ratio selector 30 in a second position.

In the power mode (with the ratio selector 30 in the first position), the cold gas flow flows in from the compressor, and is divided so the majority of the compressed gas flows through the compressor outlet manifold 14 to the cold channels of the recuperator 10, where it is heated based on heat from the exhaust gas passing through the hot channels of the recuperator 10, and then the heated compressed gas is supplied into the combustor 12. The remaining portion of the compressed gas (bleed gas) flows through the bleed channels 32 to provide a cooling flow along the combustor and turbine casing, where it is heated by the hotter fluid within the combustor 12 and turbine 8, and then is injected into the combustor through the holes in the combustor casing.

On the other hand, the hot gas flow (exhaust gas) generated in the combustor passes through the turbine inlet manifolds where it is guided by the nozzle guide vanes onto the blades of the turbine rotor (turbine wheel), driving the turbine and hence the shaft. The exhaust gas is expanded by the turbine and flows through the diffuser 21 to the aperture within the recuperator 10. In the first position as illustrated in FIG. 7, the ratio selector 30 is at least partially contained within the CHP component 200, such as within the inner aperture 21 of the recuperator 10. In this position, the ratio selector 30 entirely blocks the inlet 22a to the bypass channel 22, such that the fraction of the exhaust gas routed through the bypass channel 22 is zero, and all of the exhaust gas is routed through the recuperator channel 28. In other words, the fraction of the exhaust gas routed through the recuperator channel 28 is 1, such that the ratio between the fraction of the exhaust gas routed through the recuperator channel 28 and the fraction of the exhaust gas routed through the bypass channel 22 is also 1. This may be regarded as a power mode of the CHP system 2, since all of the exhaust is routed through the recuperator channel, thereby increasing the heat transfer between the exhaust gas and the compressed gas in the recuperator 10. The compressed gas entering the combustor 12 and the combustion gas entering the turbine 8 will therefore be at a higher temperature. This increases the efficiency thermal efficiency of the turbine 8, which in turn increases the output at the load 24 coupled to the shaft 4. In the power mode, some heating of the water in the heater 26 may also be provided, as the exhaust gas leaving the recuperator 10 is exhausted to the outside through the water heater 18.

In the second position as illustrated in FIG. 8, the cold flow of compressed gas (high pressure or HP flow) is the same as in FIG. 7. However, the ratio selector 30 is entirely contained outside the CHP component 200, for example in abutment with an outer surface 201 of the CHP component 200. In this position, the ratio selector 30 does not block the inlet 22a to the bypass channel 22, such that the fraction of the exhaust gas (low pressure or LP flow) routed through the bypass channel 22 is non-zero. In this position, the fraction of the exhaust gas routed through the recuperator channel 28 is also non-zero, such that the ratio between the fraction of the exhaust gas routed through the recuperator channel 28 and the fraction of the exhaust gas routed through the bypass channel 22 is greater than zero and less than one, for example 0.2, 0.5 or 0.8. In this position, the ratio between the fraction of the exhaust gas routed through the recuperator channel 28 and the fraction of the exhaust gas routed through the bypass channel 22 is dictated by parameters of the CHP component 200, such as the ratio between the hydraulic diameter of the recuperator channel 28 and the hydraulic diameter of the bypass channel 22 or the ratio between the pressure drop across the recuperator 10 and the pressure drop across the bypass channel 22. This may be regarded as a heat mode of the CHP system 2, since although a fraction of the exhaust gas is still routed through the recuperator channel 28, the heat transfer in the recuperator 10 between this fraction of the exhaust gas and the compressed gas may be very low. The exhaust gas at the exhaust outlet 18 is therefore at substantially the same temperature as the exhaust gas at the exit of the diffuser 20. This increases the amount of heat transfer that occurs in the heater 26 and therefore increases the temperature of the fluid, such as water, heated by the heater 26.

Although the ratio selector 30 is illustrated in FIG. 8 as being entirely contained outside the CHP component 200, this is not essential. For example, the range of position of the ratio selector 30 may be entirely contained within the CHP component 200. For example, the ratio selector 30 may be substantially annular shaped such the exhaust gas can flow through an inner aperture in the ratio selector 30. The ratio selector 30 may configured to be moved further into the CHP component 200 than the first position illustrated in FIG. 7, such that the ratio selector 30 blocks a portion of the inlet to the recuperator channel 28. In this position, the exhaust gas is able to flow into the bypass channel 22 by flowing through the inner aperture in the ratio selector 30 and into the inlet 22a to the bypass channel.

It will be appreciated that the ratio selector may operate in one or more intermediate positions between the first position and the second position in order to adjust the ratio between the first fraction of the exhaust gas routed through the recuperator channel and the second fraction of the exhaust gas routed through the bypass channel. This in turn alters the ratio of energy output by the component 200 which is converted into power in the shaft 4, transferred to the load 24, for example to be used generate electrical energy, and energy output by the component 200 converted into heat by the heater 26. As described above, the ratio selector 30 may be movable between the first position, the second position and any intermediate positions by an actuator, such as a piston. The actuator may be controlled by a controller in order to selectively move the ratio selector 30, and therefore selectively block a portion of the inlet 22a to the annular bypass channel 22 during the operation of the CHP system 2.

The CHP component 200 illustrated in FIGS. 2 to 8 may be formed of consolidated powder material, such as by energy beam melting of a metal powder as part of an additive manufacturing process. Such techniques are well suited to forming a complex arrangement of conduits, manifolds and openings as illustrated in FIGS. 2 to 8. A feature of such additively manufactured structures is that it is possible to form such structures in a way in which the material is porous to gaseous flow. Thus, for example, the holes 36a in the combustor casing 36 described above may instead (or additionally) be provided by porous openings through a porous portion of the combustor casing 36.

In additive manufacture, an article may be manufactured by successively building up layer after layer of material in order to produce an entire article. For example the additive manufacture could be by selective laser melting, selective laser centring, electron beam melting, etc. The material used for the CHP component 200 can vary, but in some examples may be a metal, for example aluminium, titanium or steel or could be an alloy.

FIG. 9 schematically illustrates additive manufacture. In this example, laser fused metal powder 88 is used to form an article such as the CHP component 200 or a component of the CHP system 2 described above. The article 200 is formed layer-by-layer upon a lowering a powder bed 80 on top of which thin layers of metal power to be fused are spread by a powder spreader 82 prior to being melted (fused) via a scanning laser beam provided from a laser 84. The scanning of the laser beam via the laser 84, and the lowering of the bed 80, are computer controlled by a control computer 86. The control computer 86 is in turn controlled by a computer program (e.g. computer data defining the article 200 to be manufactured). This article defining data is stored upon a computer readable non-transitory medium 98. FIG. 9 illustrates one example of a machine which may be used to perform additive manufacture. Various other machines and additive manufacturing processes are also suitable for use in accordance with the present techniques whereby ducting channels for routing first and second fluids between a core portion of a heat exchanger and inlet/outlet are interleaved.

The additive manufacture process may be controlled by supplying computer data defining the article 200 to be manufactured, such as an electronic design file which represents characteristics of the design to be manufactured, and inputting the design file to a computer which translates the design file into instructions supplied to the manufacturing device, such as control computer 86. For example, the computer may slice a three-dimensional design into successive two-dimensional layers, and instructions representing each layer may be supplied to the control computer 86, e.g. to control scanning of the laser 84 across the powder bed 80 to form the corresponding layer. Hence, in some embodiments rather than providing a physical apparatus, the technique could also be implemented in a computer-readable data structure (e.g. a computer automated design (CAD) file) which represents the design of an apparatus as discussed above. Thus, rather than selling the CHP component 200 in its physical form, it may also be sold in the form of data controlling an additive manufacturing machine to form such a component 200. A storage medium may be provided storing the data structure. The storage medium may be a non-transitory storage medium.

A computer implemented method may be provided for generating an electronic design file representing the component 200 of the combined heat and power system 2. The method comprises the step of generating the electronic design file specifying the component 200. As stated above, the component 200 comprises the recuperator 10, the combustor casing 36, the combustor 12, the turbine casing 34, the exhaust outlet 18, the recuperator channel 28 and the bypass channel 22 as described above in relation to FIGS. 2 to 6.

In order to produce a component 200 tailored to a specific application or use, for example a CHP system with a maximum power output of 100 kW, in some examples the method comprises adjusting at least one parameter of the component according to design specification data specifying design requirements of the combined heat and power system. For example, the at least one parameter may comprise a ratio between a hydraulic diameter of the recuperator channel and a hydraulic diameter of the bypass channel. The at least one parameter may related to parameters which contribute to a pressure drop in the recuperator 10, such as the hydraulic diameter, flow length and the frontal area of the recuperator 10. Alternatively or in addition, it may be desirable to optimise the mass flow of the component 200 for power. In this example, the frontal area of the recuperator 10, the sizing of the turbine casing 32, the frontal area of the combustor 12 and/or the size of the fuel delivery passages are adjusted according to design specification data. In another example, it may be desirable to optimise the effectiveness of the recuperator 10. In this example, the frontal area and/or the flow length of the recuperator 10 are adjusted according to design specification data. In another example, the size of the heater to be used with the component 200, or the size of a heater included in the component 200 adjusted according to design specification data.

FIG. 10 illustrates a method 1000 of generating a component using additive manufacture, for example the CHP component 200 as described above. The method 1000 begins at step 1010, where design specification data is received. At step 1020, an electronic design file, for example in the form of a computer-aided design (CAD) file, is generated. The electronic design file represents the CHP component with at least one parameter adjusted according to design specification data as described above. At step 1030, the electronic design file, such as a CAD file, is converted into instructions for controlling an additive manufacture machine (e.g. by slicing the 3D design into 2D layers, and generating instructions for controlling the pattern of laser scanning for each of the 2D layers). At step 1040, the CHP component is manufactured as an integrated mass of consolidated material using additive manufacture.

In the present application, the words "configured to . . . " are used to mean that an element of an apparatus has a configuration able to carry out the defined operation. Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A combined heat and power system comprising:
a shaft;
a compressor coupled to the shaft to compress intake gas to form compressed gas;
a recuperator to heat the compressed gas to form heated compressed gas;
a combustor to combust a fuel and the heated compressed gas to form combustion gas;

a turbine coupled to the shaft to expand the combustion gas to form exhaust gas;

a load coupled to the shaft;

an exhaust outlet to expel the exhaust gas to a heater for heating a fluid based on heat from the exhaust gas;

a recuperator channel providing a path for the exhaust gas to flow from the turbine to the exhaust outlet through the recuperator;

a compressor outlet manifold to supply the compressed gas from the compressor to the recuperator, in which the combustor comprises an annular combustor extending around at least one of the turbine and a diffuser for supplying the exhaust gas from the turbine to the recuperator, and the compressor outlet manifold comprises an annular channel extending around the annular combustor; and a bypass channel providing a path for the exhaust gas to flow from the turbine to the exhaust outlet bypassing the recuperator; in which:

the recuperator, a casing of the combustor, a casing of the turbine, the exhaust outlet, the recuperator channel and the bypass channel form an integrated mass of consolidated material.

2. The combined heat and power system according to claim 1, comprising a ratio selector to variably adjust a ratio between a first fraction of the exhaust gas routed through the recuperator channel and a second fraction of the exhaust gas routed through the bypass channel.

3. The combined heat and power system according to claim 2, in which the ratio selector is configured to support at least one operating mode in which both the first fraction and the second fraction are non-zero.

4. The combined heat and power system according to claim 2, in which the ratio selector comprises an adjustable barrier to adjust a fraction of an inlet to the bypass channel that is blocked by the adjustable barrier.

5. The combined heat and power system according to claim 4, in which:

the recuperator comprises an annular heat exchanger arranged in an annulus around an exit of a diffuser for supplying the exhaust gas from the turbine to the recuperator;

the bypass channel comprises an annular bypass channel extending around the exit of the diffuser downstream from the recuperator;

the adjustable barrier is configured to move in and out of a central aperture of the annular bypass channel to selectively block a portion of the inlet to the bypass channel.

6. The combined heat and power system according to claim 1, comprising a bleed channel from the compressor outlet manifold to direct a portion of the compressed gas along at least one of a casing of the turbine and a casing of the combustor.

7. The combined heat and power system according to claim 6, comprising a plurality of nozzle guide vanes to guide the combustion gas from the combustor to the turbine; in which the bleed channel comprises one or more cavities extending through the nozzle guide vanes.

8. The combined heat and power system according to claim 6, in which the bleed channel is configured to expel said portion of the compressed gas into the combustor through at least one hole in the casing of the combustor.

9. The combined heat and power system according to claim 1, in which the heater is also part of said integrated mass of consolidated material.

10. The combined heat and power system according to claim 9, in which the recuperator comprises an annular heat exchanger arranged in an annulus around an exit of a diffuser for supplying the exhaust gas from the turbine to the recuperator; and the heater comprises a further annular heat exchanger arranged about the circumference of the annular heat exchanger.

11. The combined heat and power system according to claim 1, in which the integrated mass of consolidated material also comprises at least one of:

a diffuser for supplying the exhaust gas from the turbine to the recuperator;

at least a portion of a compressor outlet manifold for supplying the compressed gas from the compressor to the recuperator;

at least a portion of a turbine inlet manifold for supplying the combustion gas from the combustor to the turbine; and at least a portion of a fuel inlet channel for supplying the fuel to the combustor.

12. The combined heat and power system according to claim 1, in which the recuperator channel is configured to pass the exhaust gas through a turn of 90 degrees or less between the turbine and the exhaust outlet.

13. A component for a combined heat and power system, the component comprising:

a recuperator to heat compressed gas received from a compressor to form heated compressed gas;

a combustor casing to house a combustor for combusting a fuel and the heated compressed gas to form combustion gas;

a turbine casing to house a turbine rotor to form a turbine for expanding the combustion gas to form exhaust gas;

an exhaust outlet to expel the exhaust gas to a heater for heating a fluid based on heat from the exhaust gas;

a recuperator channel providing a path for the exhaust gas to flow from the turbine to the exhaust outlet through the recuperator;

a compressor outlet manifold to supply the compressed gas from the compressor to the recuperator, in which the combustor comprises an annular combustor extending around at least one of the turbine and a diffuser for supplying the exhaust gas from the turbine to the recuperator, and the compressor outlet manifold comprises an annular channel extending around the annular combustor; and a bypass channel providing a path for the exhaust gas to flow from the turbine to the heater bypassing the recuperator, in which:

the recuperator, the combustor casing, the turbine casing, the exhaust outlet, the recuperator channel and the bypass channel form an integrated mass of consolidated material.

14. The component of claim 13, further comprising the heater.

15. A method for manufacturing the component according to claim 13, comprising manufacturing the component by additive manufacture.

16. A non-transitory storage medium storing a computer-readable data structure representing a design of the component according to claim 13.

* * * * *